UNITED STATES PATENT OFFICE.

HENRY ROSCOE, OF NEW YORK, N. Y.

IMPROVED COMPOSITION FOR REFINING AND HARDENING STEEL.

Specification forming part of Letters Patent No. 50,039, dated September 19, 1865.

*To all whom it may concern:*

Be it known that I, HENRY ROSCOE, of the city, in the county of New York and State of New York, have invented a new and Improved Composition for Refining and Hardening Steel; and I do hereby declare that the following is a full, clear, and exact description thereof, which will enable others skilled in the art to fully understand and make use of the same.

This invention relates to a composition which will render common steel fit for good tools, which will restore steel that has been destroyed by overheating, and which prevents steel from cracking in hardening.

The composition is made of chlorate of potash and carbonate of soda, and to these ingredients borax may be added, if desired, although I consider borax not essential for the success of my composition.

The ingredients which constitute my composition are mixed together in about the following proportions: chlorate of potash, one pound; carbonate of soda, two pounds. If borax is added the quantity of this material is regulated according to the price of the several ingredients and according to the desired strength of the composition.

By the action of carbonate of soda steel is refined and restored after its has been destroyed by overheating, and by its use good tools can be produced of common steel without the use of charcoal fire. The chlorate of potash replaces the life in the steel when the same has been destroyed by long continuous or repeated heating, and by a combination of both materials, with or without borax, a composition is produced which prevents the steel from cracking while being hardened, and which enables such steel to retain all its good qualities under the most adverse circumstances.

I claim as new and desire to secure by Letters Patent—

1. The use of a composition consisting of chlorate of potash and carbonate of soda for hardening and refining steel.

2. The use of borax in connection with either chlorate of potash or carbonate of soda, or both combined.

HENRY ROSCOE.

Witnesses:
M. M. LIVINGSTON,
C. L. TOPLIFF.